(12) United States Patent
Kawamura

(10) Patent No.: US 6,931,301 B2
(45) Date of Patent: Aug. 16, 2005

(54) SYSTEM PROCESSING TIME COMPUTATION METHOD COMPUTATION DEVICE, AND RECORDING MEDIUM WITH COMPUTATION PROGRAM RECORDED THEREON

(75) Inventor: Naoki Kawamura, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 259 days.

(21) Appl. No.: 10/202,872

(22) Filed: Jul. 26, 2002

(65) Prior Publication Data
US 2003/0022404 A1 Jan. 30, 2003

(30) Foreign Application Priority Data
Jul. 26, 2001 (JP) .......................................... 2001-225369

(51) Int. Cl.$^7$ ................................................. G06F 7/00
(52) U.S. Cl. ........................ 700/217; 716/19; 382/144; 7/121
(58) Field of Search ................................. 700/121, 124, 700/217; 382/144–145, 151; 355/27, 53; 716/19

(56) References Cited

U.S. PATENT DOCUMENTS 5,668,733 A * 9/1997 Morimoto et al. ............. 716/19
6,275,744 B1 * 8/2001 Yoshida ....................... 700/218

FOREIGN PATENT DOCUMENTS

| EP | 0 644 470 | 3/1995 |
| JP | 8-108063 | 4/1996 |
| JP | 2001-75631 | 3/2001 |

* cited by examiner

Primary Examiner—Stacy A. Whitmore
(74) Attorney, Agent, or Firm—Young & Thompson

(57) ABSTRACT

A method for the computation of a system processing time in performing an operation in a system which can process a plurality of lots in a continuous or parallel manner, wherein the processing time of an object lot is computed based on the minimum processing time S0 for the object lot, the contents of the operation of a lot which is currently being processed, and the actual processing time of a lot, for which the operation has recently been completed.

14 Claims, 13 Drawing Sheets

1, #2, #3, #4: CHAMBER
12: LOAD LOCK CHAMBER
13: ETCHING CHAMBER
14: HEATING CHAMBER
15: SPUTTERING CHAMBER
16: AUTOLOADER
20: PROCESSING SYSTEM

1, #2, #3, #4, #5, #6, #7: CHAMBER
17: PROCESSING TANK
20: PROCESSING SYSTEM $A = S0$ $A = S0' = S1 + R0 - T0$ $A = S0'' = S1' + R0 - T0$
$= (PT + R1 - T1) + R0 - T0$
$= PT + R1 + R0 - T1 - T0$

SYSTEM PROCESSING TIME COMPUTATION METHOD COMPUTATION DEVICE, AND RECORDING MEDIUM WITH COMPUTATION PROGRAM RECORDED THEREON

FIELD OF THE INVENTION

The invention relates to a system processing time computation method, a computation device, and a recording medium with a computation program recorded thereon. More particularly, the invention relates to a system processing time computation method, a computation device, and a recording medium with a computation program recorded thereon, for use in lot-by-lot processing, for example, using a multichamber apparatus, wherein a plurality of chambers are disposed around a vacuum chamber, or a wet processing apparatus wherein a plurality of processing tanks are arranged in series.

BACKGROUND OF THE INVENTION

A multichamber apparatus is used in a semiconductor device production process, where the multichamber apparatus includes a plurality of chambers disposed around a vacuum chamber or, the multichamber apparatus includes a wet processing apparatus with a plurality of processing tanks arranged in series. As discussed above, such apparatus may be used in lot-by-lot processing where one lot is processed after another lot.

In these processing systems, the processing time necessary for a certain current lot is influenced by the processing time necessary for a previous lot which was earlier introduced into the processing system. At the outset, the construction of this type of processing system and the status of operation will be explained.

FIG. 1 is a schematic plan view showing the construction of this type of multichamber apparatus. As shown in the drawing, two load lock chambers 12, one etching chamber 13, one heating chamber 14, and four sputtering chambers 15 are disposed around a separation chamber 11. An autoloader 16 is disposed outside the load lock chambers 12.

Processing using this processing system is carried out as follows. Here it is assumed that the processing time in the sputtering chamber 15 is four times that in the etching chamber 13 and the heating chamber 14. For example, a cassette for a certain lot consisting of 26 wafers (hereinafter referred to as "lot A") is first carried in the right-side load lock chamber 12 (load lock chamber #1) through the autoloader 16. A first wafer in the lot A is taken out by a robot installed within the separation chamber 11 and is carried in the etching chamber 13. Upon the completion of processing of the first wafer in the etching chamber 13, the first wafer is carried in the heating chamber 14. Subsequently, a second wafer is carried in the etching chamber 13. When the processing of the first wafer in the etching chamber 13 and the processing in the heating chamber 14 has been completed, the first wafer is carried in one of the sputtering chambers, for example, the right-side sputtering chamber (chamber #1) and the second wafer is carried in the heating chamber 14.

Next, a third wafer is carried in the etching chamber 13. When the processing in the etching chamber 13 and the processing in the heating chamber 14 have been completed, the second wafer is carried in one of the sputtering chambers, for example, the second sputtering chamber from the right (chamber #2) and the third wafer is carried in the heating chamber 14. Thereafter, in the same manner as described above, wafers are successively carried in and processed in processing chambers. Upon the completion of processing in the sputtering chamber, the wafer is returned to the cassette within the right-side load lock chamber 12 (chamber #1). When processing has been completed for all the wafers of the lot A and all the wafers of the lot A have been returned to the cassette, this cassette is withdrawn through the autoloader 16 to the outside of the processing system 20. During processing for the lot A using the load lock chamber #1, a next lot to be processed using this processing system (hereinafter referred to as "lot B") is carried in the load lock chamber #2.

As soon as the processing of the final wafer in the lot A. has been completed and this wafer has been returned to the cassette in the load lock chamber #1, a first wafer in the lot B within the load lock chamber #2 is taken out by the robot installed in the separation chamber 11 and is carried in the etching chamber 13. Thereafter, the remaining wafers in the lot B are successively processed in the same manner as described above in the processing of the wafers in the lot A.

It should be noted that, in the above multichamber apparatus, all the chambers are not alwaysoperable. For example, there is a possibility that, among the four sputtering chambers 15, only two chambers are operable (hereinafter referred to often as "operable chambers"). In this case, as compared with the case where the four chambers areoperable, the processing time necessary for the lot is approximately doubled.

FIG. 2 is a schematic perspective view showing the construction of a wet processing apparatus wherein a plurality of lots are successively introduced. In this processing system 20, seven processing tanks 17 are arranged in series. In the example shown in the drawing, the lot A is processed in all the processing tanks 17, whereas, for the lot B, processing is not carried out in the second and third processing tanks from the left (processing tanks #2 and #3). At the outset, a container, which holds wafers of the lot A, together with the wafers, is carried in and processed in the processing tank #1. Upon the completion of processing in the processing tank #1, the container holding the wafers of the lot A is carried in the processing tank #2. Next, the wafers of the lot B, together with the container holding the wafers, are carried in and processed in the processing tank #1. Upon the completion of processing in the processing tank #2, the wafers of the lot A are carried in and processed in the processing tank #3. Thereafter, in the same manner as described above, the wafers of the lot A are processed in the processing tanks #4 to #7 and are then carried out to the outside of the processing system 20.

On the other hand, for the lot B, even after the completion of processing in the processing tank #1, the lot B is on standby until the lot A is processed in the processing tank #4 and is carried out to the processing tank #5. Thereafter, the lot B is carried in and processed in the processing tank #4, followed by processing in the processing tanks #5 to #7 in the same manner as described above.

FIG. 3 shows an example of the elapse of time in the processing of a plurality of lots using the above processing system. The operation for the lot A is started at time t1, and the operation for the lot B is started at time t2. For lot C, the operation is scheduled to be started at time t3. For the lot A, at time t4, the operation is completed. Upon the start of the operation or upon the end of the operation, these times t1 to t4 are reported from the processing system side to the production control device side. In the processing process as shown in the drawing, the processing time for the lot B (difference between operation end time and operation start time) is possibly influenced by the processing time of the lot A. Likewise, the processing time for the lot C is possibly influenced by the processing time for the lot B. The invention is directed to the prediction of processing time for the lot C which is about to be processed or for which the processing has been started.

In addition to the processing time for the previous lot, for example, the number of wafers contained in the lot, the processing time necessary in each chamber or processing tank, the number of load locks in the processing system, and the number of operable chambers are considered as factors governing the processing time for each lot.

FIG. 4 is a block diagram illustrating a processing method using a conventional scheduler. In FIG. 4, a scheduler 1 inquires concerning the time necessary for processing in the processing system, that is, the processing time, of a processing time data maintaining device 8. Upon the receipt of the inquiry, the processing time data maintaining device 8 returns, to the scheduler 1, information on the type of processing system, in which processing operation is carried out, and an estimated value maintained for each type of operation condition. Based on the received estimated values, the scheduler 1 predicts the end time, and, based on the predicted end time, determines the order of operation of the object lot and the prediction of the operation for the lot. The scheduler 1 gives the prediction of lot operation to the transfer control unit 6. According to the prediction of lot operation, the transfer control unit 6 performs control so that a transfer device 10 transfers, from an automatic tray 9 storing a lot as a processing object, the lot to the processing system 20 where processing is carried out.

The processing operation using the conventional line scheduler has the following problems. The first problem is that the processing time of the system is estimated on the assumption that, independently of the status of the operation of the previous lot, the processing time is a given time for the type and operation conditions for each processing system. Therefore, a difference occurs between the given value estimated for each type of processing system and for each operation condition and the actual processing time which depends upon the status of operation of the previous lot. As a result, the schedule of the lot operation output from the scheduler is different from the actual lot operation. For this reason, the control is performed so that, upon the output from the scheduler, the processing device is on extra standby, or otherwise, the lot, which has been scheduled so as to provide no standby time, is brought to a standby state.

The second problem is that, when parameters are specified in detail, i.e., the time of processing in chamber within the processing system, the time of transfer by the robot within the processing system, the load lock time and the like by the conventional method are specified in detail, wherein a given time is set for each unit operation, to enhance the accuracy of the predicted processing time, the number of processing times to be Bet is very large, making it impossible to manually perform the setting.

SUMMARY OF THE INVENTION

Accordingly, it is an object of the invention to provide a system processing time computation device which, while taking into consideration the status of the processing system and the status of the previously processed lot, can compute the processing time with a much smaller error than the conventional device using a fixed value.

It is another object of the invention to realize a highly accurate prediction of processing time without the necessity of setting a very large number of processing times.

According to the first feature of the invention, there is provided a method for computing a system processing time in performing an operation in a system which can process a plurality of lots in a continuous or parallel manner, wherein the processing time of an object lot is computed taking into account the minimum processing time So for an object lot, the contents of the operation of a current lot being processed, and the actual processing time of a recently completed lot, According to the second feature of the invention, there is provided a medium comprising, recorded thereon, a program for executing the method for the computation of a system processing time.

According to the third feature of the invention, there is provided a system processing time computation device having the function of computing processing time in performing an operation in a system which can process a plurality of lots in a continuous or parallel manner, said device comprising:

a minimum end time difference section for maintaining or computing the minimum end time difference between two successive lots;

a minimum processing time section for maintaining or computing the minimum processing time of each lot; and a processing time computation section for receiving information on an object lot for the computation of a processing time, the history of processing system and data on the minimum end time difference section and the minimum processing time section and for computing the processing time of the object lot using the history of the processing system, the minimum end time, and the minimum processing time.

BRIEF DESCRIPTION OF THE DRAWINGS

The invention will be explained in more detail in conjunction with the appended drawings, wherein.

DESCRIPTION OF THE PREFERRED EMBODIMENTS

Before the explanation of preferred embodiments of the invention, the principle of the invention will be explained.

Figure 1:
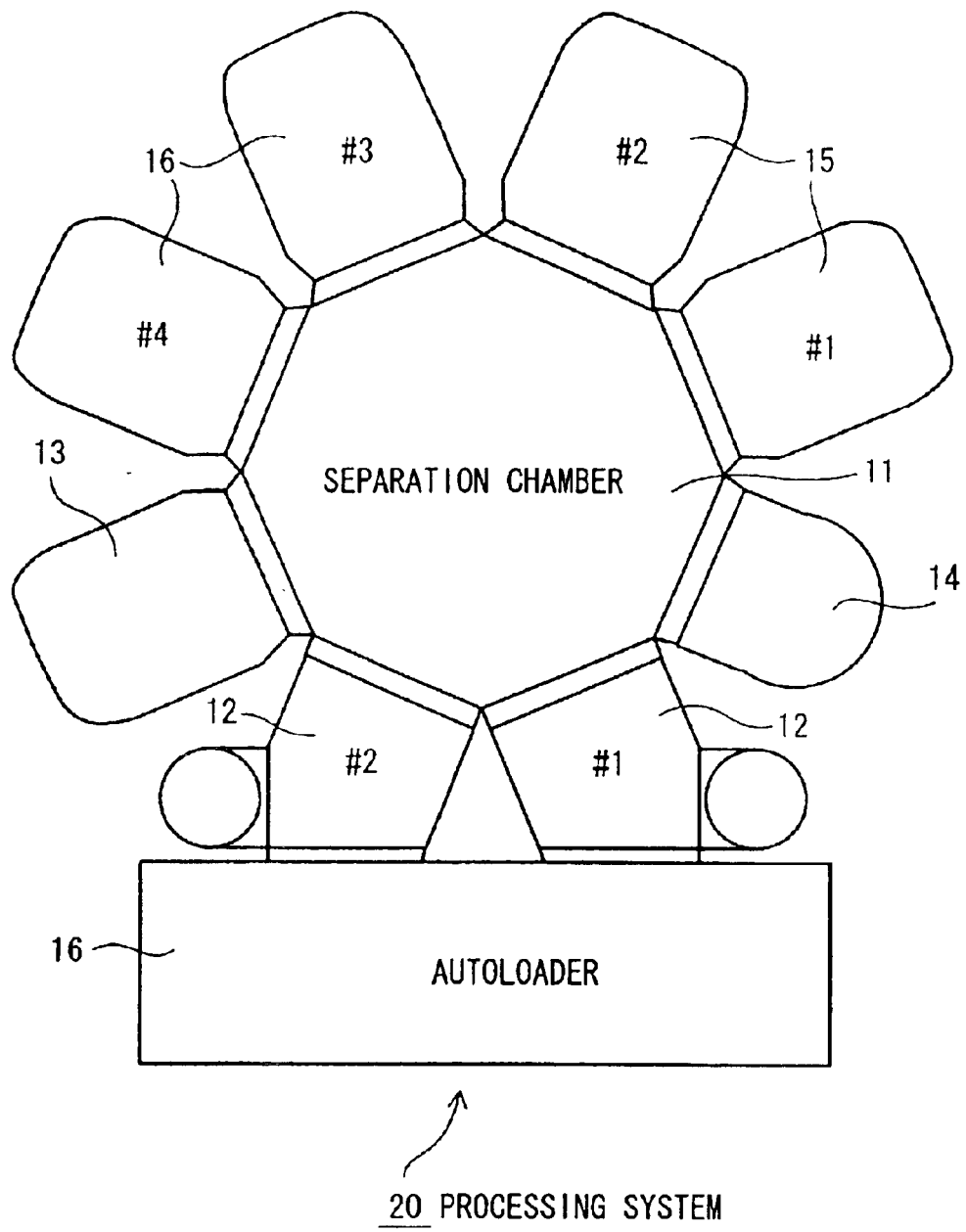
FIG. 1 is a schematic plan view showing one example of a processing system.
Figure 2:
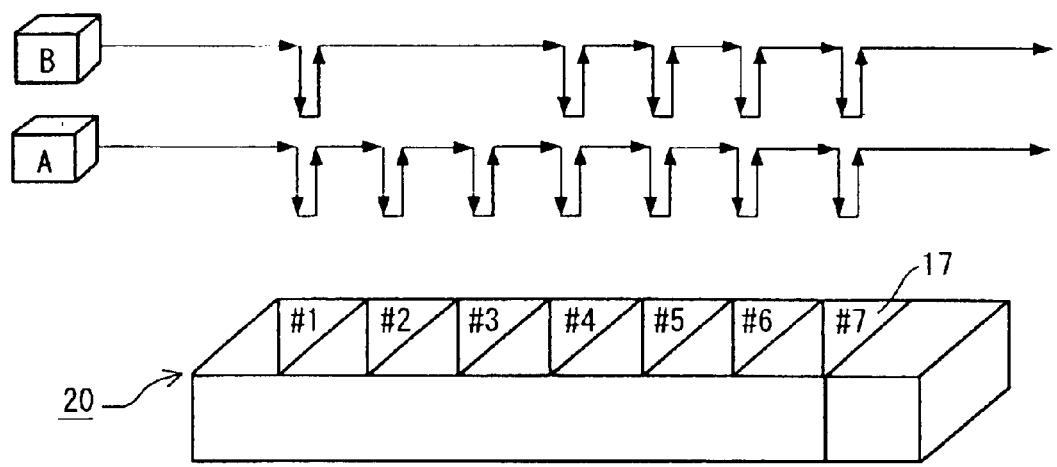
FIG. 2 is a schematic perspective view showing another example of a processing system.
Figure 3:
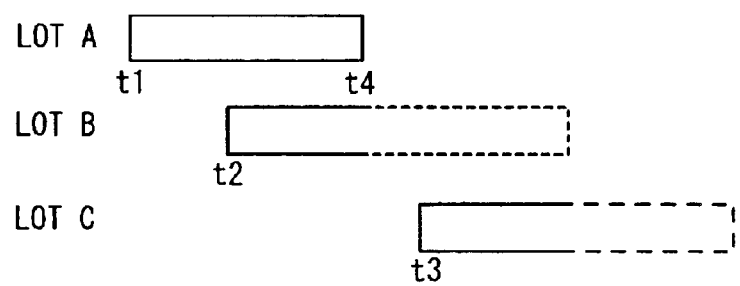
FIG. 3 is a time chart for a processing lot, illustrating an example of the prior art.
Figure 4:
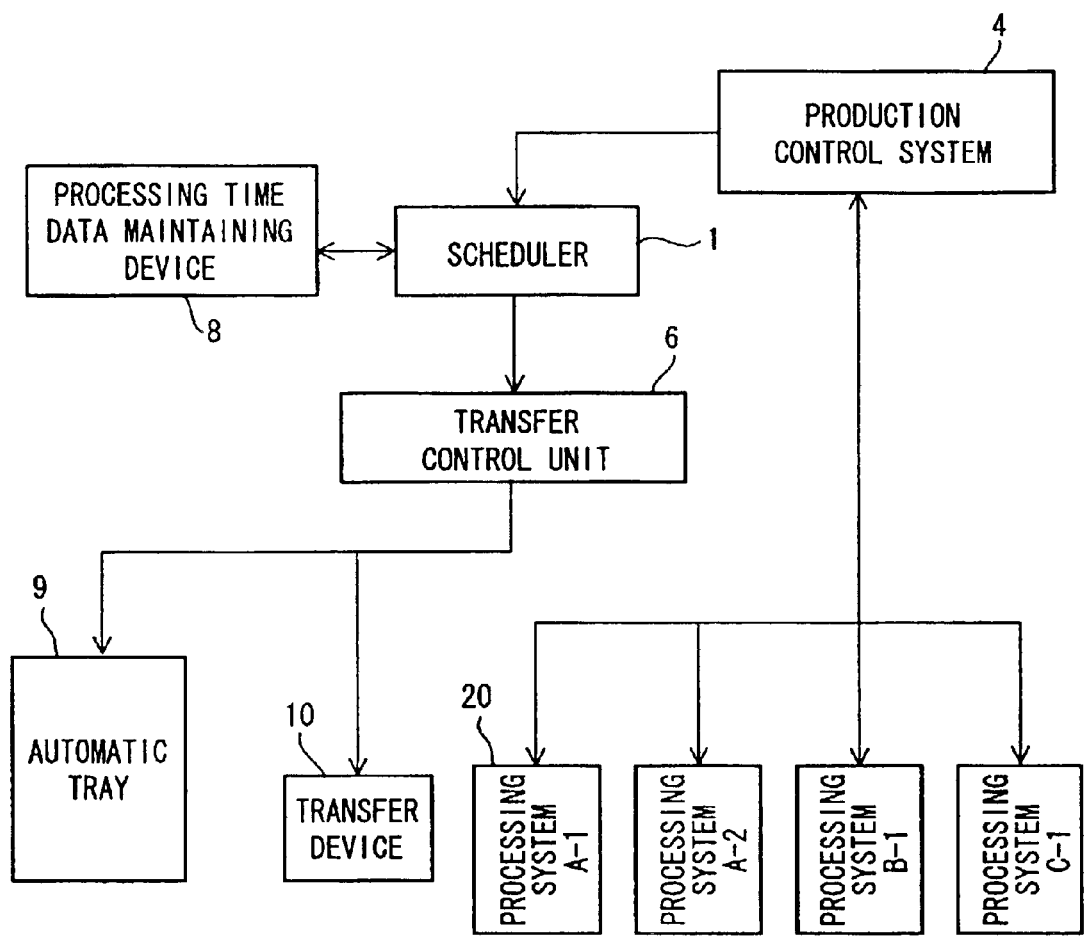
FIG. 4 is a block diagram of a conventional production system.
Figure 5A:
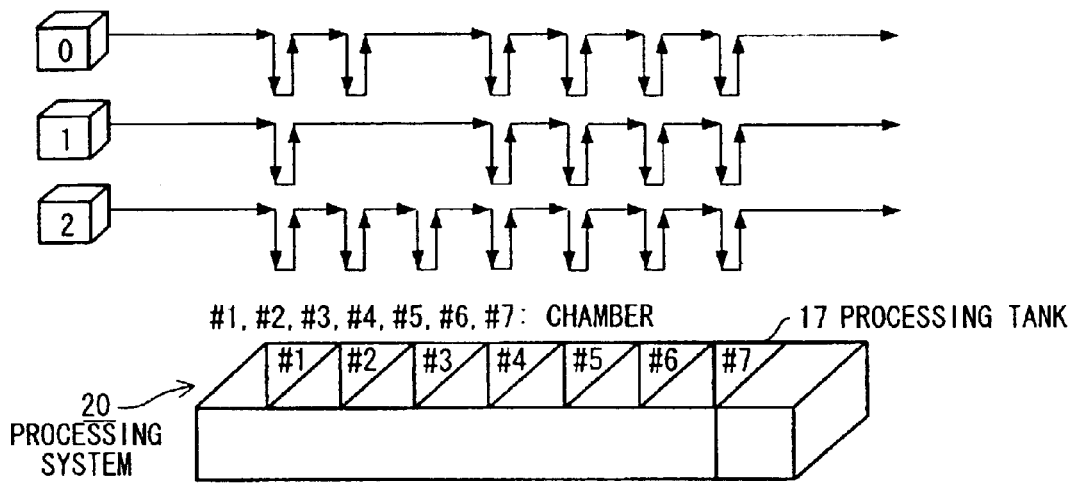
FIGS. 5A to 5D are diagrams illustrating the principle of the invention and showing a time chart for processing lots.

FIGS. 5A to 5D are diagrams illustrating the principle of the invention. FIG. 5A shows, as one example of a processing system 20, a wet processing system having seven processing tanks 17. A lot, as an object lot for the computation of processing time, is designated as lot 0. A lot just before the object lot (a lot one before the object lot) is designated as lot 1. A lot two before the object lot is designated as lot 2 (the same shall apply hereinafter).

Definition of Minimum Processing Time, S

Figure 5B:
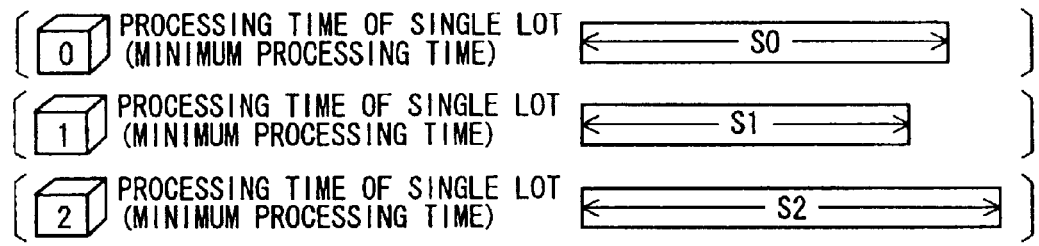

The processing time necessary for each lot is considered to be influenced by the processing time for a lot one before the object lot. In this connection, it is considered that, when the difference in operation start time between the object lot and the lot one before the object lot is satisfactorily large, the operation is completed in a given time without undergoing the influence of the previous lot. This is regarded as the minimum processing time for this lot, and, for lots 0, 1, 2, . . . , the minimum processing times are represented by S0, S1, S2, . . . (FIG. 5B). In preferred embodiments of the invention, estimated values are used as these numerical values.

Definition of Minimum End Time Difference, R

It is considered that, when the difference in operation start time between two successive lots is large, the difference in operation end time between the successive two lots is close to the operation start time difference, whereas when the operation start time difference is small, the difference in operation end time is a substantially given value.

Figure 5C:
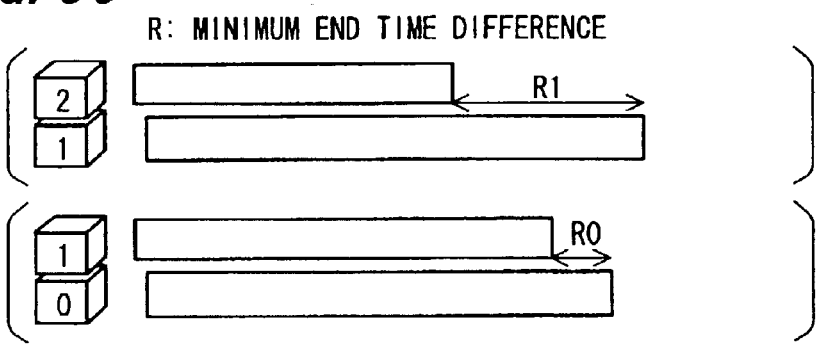

The difference in operation end time between the two successive lots, which is a given value independently of the operation start time difference, is regarded as the minimum end time difference and is represented by R0, R1, . . . (FIG. 5C). Here Rk is the difference in end time between lot k and lot (k+1) when processing standby has occurred in the lot k due to the lot (k+1). In the preferred embodiment of the invention, an estimated value is also used as this minimum end time difference.

Definition of Start Time Difference, T

Figure 5D:
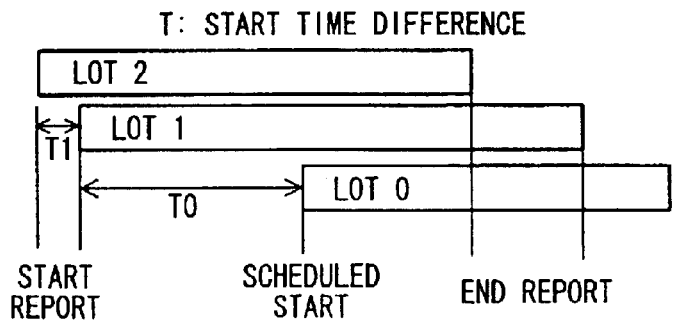

The difference in operation start time between the lot (k+1) and the lot k is regarded as a start time difference and is represented by Tk (FIG. 5D). In this connection, it should be noted that the operation start time of the lot 0 is a scheduled operation start time, and the operation start time of other lots is actual operation start time. The time reported from the processing system is used for all the operation start times except for the operation start time of the lot 0.

Estimation of S and R

In the invention, S and R are parameters, which are set before processing time computation, and should be previously provided. These parameters can be determined by computation. In this case, however, the amount of data to be treated is very large, and, thus, this method is unrealistic. Accordingly, in the preferred embodiment of the invention, a method is adopted wherein S and R are estimated from past actual results. This estimation method will be explained below.

Figure 6:
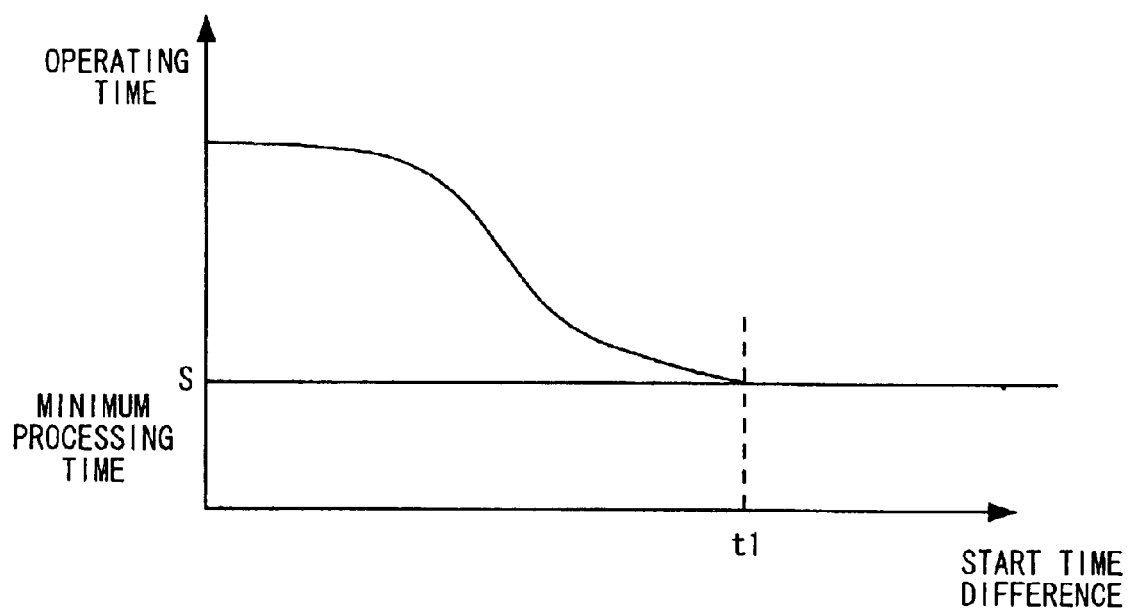
FIG. 6 is a graph showing the relationship between the start time difference and the processing time, for illustrating the principle of the invention.

When the relationship of the processing time for a lot under certain operation conditions with the difference in operation start time between this lot and a lot immediately before this lot is taken into consideration, it is considered that, in the case of a large difference in operation start time, there is no possibility that this lot is brought to a standby state within the processing system by the lot just before this lot and the operation is completed in the minimum time, while, when the operation start time difference is small, this lot is brought to a standby state by the lot just before this lot and the processing time is increased by the standby time. Actual results are shown in FIG. 6, wherein the ordinate represents processing time and the abscissa represents start time difference. Specifically, in order to provide an estimate value of the minimum processing time S for lots under respective operation conditions, the start time difference t1 shown in FIG. 6 is used as the threshold value, and the processing time, in which the start time difference is larger than the threshold value, may be estimated as the minimum processing time S.

Figure 7:
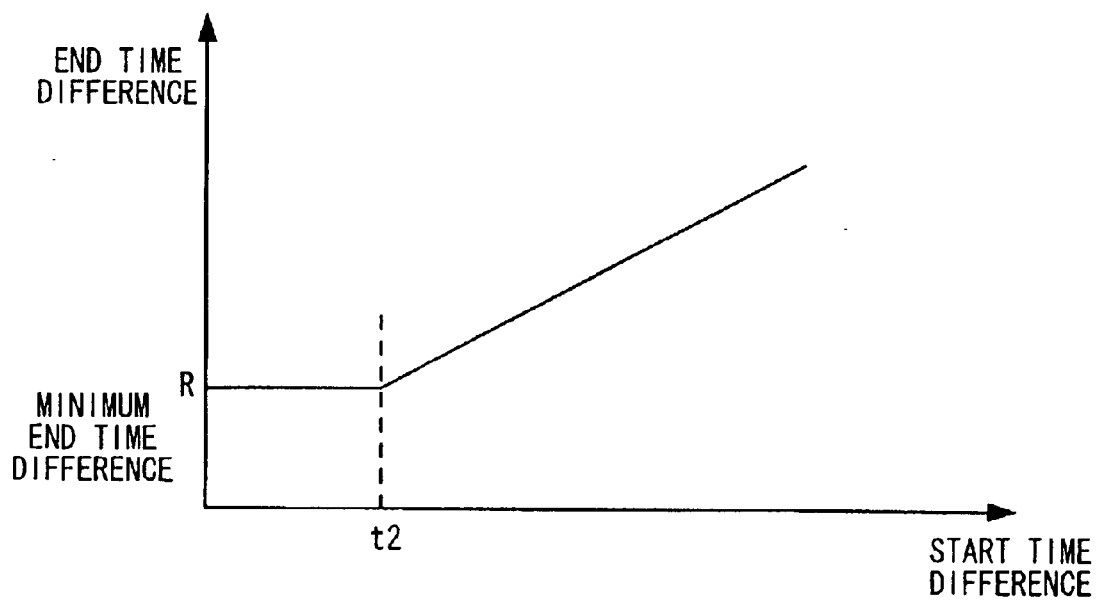
FIG. 7 is a graph showing the relationship between the start time difference and the end time difference, for illustrating the principle of the invention.

For a combination of operation conditions for a certain object lot with operation conditions for a lot just before the object lot, when the relationship of the start time difference between both the lots with the end time difference between both the lots is taken into consideration, in the case of a small start time difference, the object lot is brought to a standby state by the lot just before the object lot. In this case, it is considered that the end time difference is a given value in the case of the occurrence of standby. On the other hand, when the start time difference is large, the object lot is not brought to a standby state by the lot immediately before the object lot and, in this case, the end time difference depends upon the magnitude of the start time difference. Specifically, measured values are shown in FIG. 7, wherein the ordinate represents end time difference and the abscissa represents start time difference. When the minimum end time difference R, which is determined by each combination of operation conditions, is estimated, the start time difference t2 shown in FIG. 7 is used as the threshold value and an end time difference of not more than the threshold value may be estimated as the minimum end time difference R.

Computation of Processing Time

Here the following assumptions are made. Subsequent to the operation of the lot 2, the operation of the lot 1 is started followed by the start of the lot 0 which is an object of the processing time computation. The minimum processing time of the lot 0 and the minimum processing time of the lot 1 are S0 and S1, respectively. The minimum end time difference between the lot 1 and lot 0 and the minimum end time difference between the lot 2 and lot 1 are R0 and R1, respectively. When the operation of the lot 0 is started, the operation of the lot 2 is in the completed state and the processing time of the lot 2 is PT. The difference in start time between the lot 1 and the lot 0 and the difference in start time between the lot 2 and the lot 1 are T0 and T1, respectively.

Figure 8A:
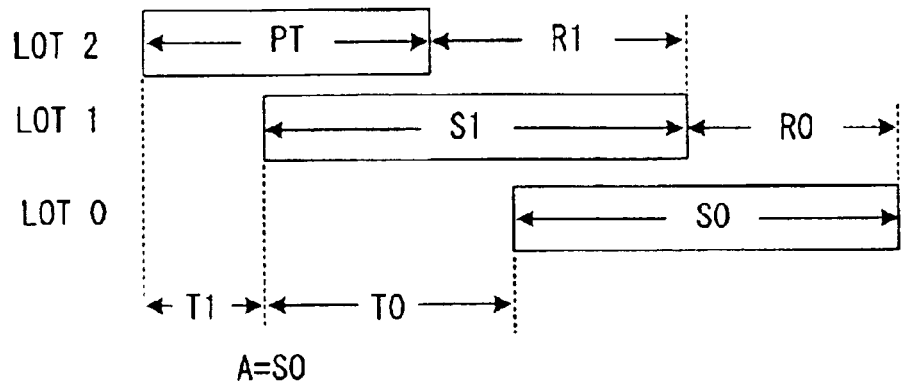
FIGS. 8A to 8C are time charts for processing lots, illustrating the principle of the invention.
Figure 8B:
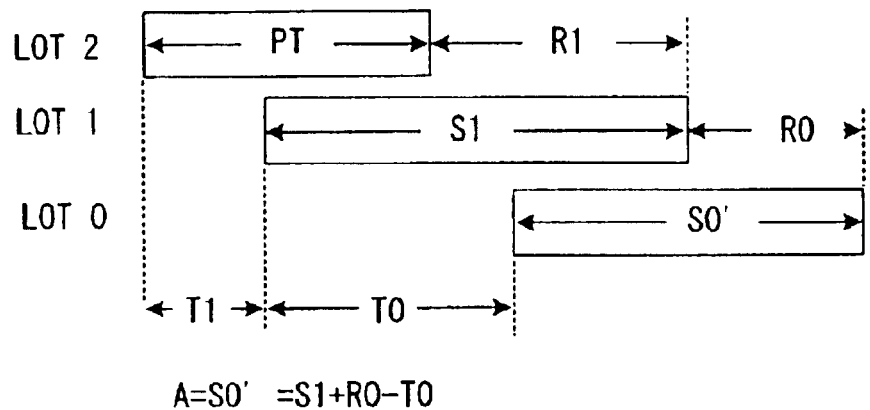
Figure 8C:
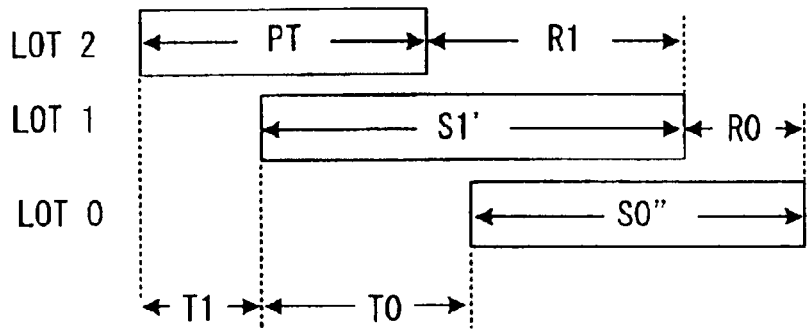

In this case, there are three possible cases: (i) the operation of the lot 0 is completed without standby being caused by the lot 1 (this case is shown in FIG. 8A); (ii) the lot 1 is not made to standby by the lot 2, but the lot 0 is made to standby by the lot 1 (this case is shown in FIG. 8B); and (iii) the lot 1 is made to standby by the lot 2, and the lot 0 is also made to standby by the lot 1 (this case is shown in FIG. 8C).

For each case, a processing time candidate A will be determined. For the case (i), the processing time candidate A is the minimum processing time S0 of the lot 0. That is, $$A=S0.$$

For the case (ii), the processing time candidate A is S0' in which the lot 0 is made to standby by the lot 1. S0, is determined by S1+R0−T0. That is, $$A=S1+R0\ T0.$$

For the case (iii), the processing time candidate A is S0", in which the lot 0 is made to standby by the lot 1, and the processing time of the lot 1 is S1' in which the lot 1 is made to standby by the lot 2. Since S0"=S0'+R0−T0 and S0'=PT+R1−T1, $$A=PT+R1+R0-T1-T0.$$

In the invention, the maximum A among the three processing time candidates A is estimated as the processing time of the lot 0.

The above explanation is for the case where the operation of the lot 2 is completed before the start of the operation of the lot 0. In order to generalize this, it is assumed that the latest operation completed lot before the start of operation of lot 0 is lot X wherein X is an integer of 2 or more. The minimum processing time of the object lot for the computation of the processing time and the lots before the object lot, i.e., S0 to SX, the minimum end time difference between two successive lots, i.e., R0 to R(X−1), the start time difference between two successive lots, i.e., T0 to T(X−1), and the actual processing time PT of the latest operation completed lot are used to determine three processing time candidates A, i.e., (X+1) processing time candidates A, as follows.

(1) A=S0.

(2) In equation (i), calculation is carried out from n=0 to n=(X−2).

$$A=S(n+1)+\Sigma\{Rm-Tm\} \quad (i)$$

wherein Σ means the sum of m=0, . . . m=n.

(3) Calculation is carried out according to equation (ii).

$$A=PT+\Sigma\{Rm-Tm\} \quad (ii)$$

wherein Σ means the sum of m=0, . . . m=X−1.

Among the (X+1) A's, the maximum A is regarded as the processing time for the object lot for the computation of the processing time.

Preferred Embodiment 1

Figure 9:
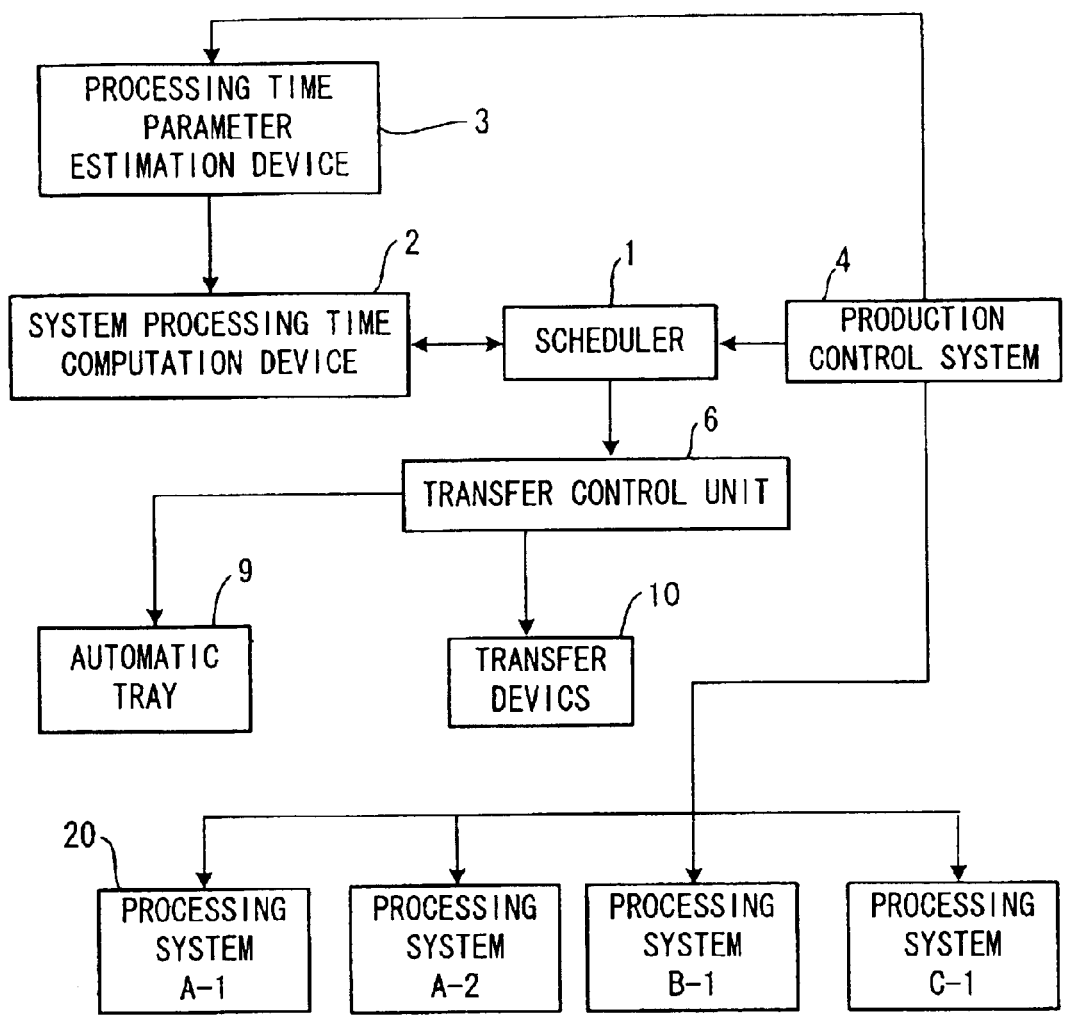
FIG. 9 is a block diagram showing a production system according to the invention.

FIG. 9 is a schematic block diagram showing the construction of a production system comprising a plurality of processing systems 20 and the system processing time computation device 2 according to the invention. Here processing system A-1 and processing system A-2 are of the same type. The processing system A-1, a processing system B-1, and a processing system C-1 are different from one another in type. In FIG. 9, for each lot, the production control system 4 receives, from each processing system 20, an operation start report, an operation end report, operation conditions, the number of wafers to be processed, and the status of the system and stores these data as a history. The production control system 4 maintains current in-process information of each processing system 20 based on the status of the report from each processing system and information on operation procedure. A scheduler 1 acquires, from the production control system 4, operation history data (a record of the history for each processing, from a given past period to the present time, i.e., operation conditions, operation start time, operation end time, the number of wafers to be processed, and the processing system) and the current in-process data of each processing system 20, and acquires the history of the system operation status including the status of operation of each chamber in each processing system. Regarding lots for which the allocation of operation to individual processing systems is carried out, information on scheduled operation conditions, the number of wafers to be processed, the system operation status including the status of operation of each chamber in each processing system, and scheduled start time is sent to the system processing time computation device 2.

The system processing time computation device 2 computes a system processing time (operation end time) based on the information received from the scheduler 1 and, in addition, using past operation history data received from the scheduler 1 and parameters estimated by a processing time parameter estimation device 3. The system processing time computation device 2 sends the information on system processing time to the scheduler 1. Based on the received information on the system processing time, the scheduler 1 sends information on the order of processing of the lot and prediction of operation of the lot to a transfer control unit 6 and a production control system 4. Upon the receipt of the information on the prediction of operation of the lot from the scheduler 1, the transfer control unit 6 permits a transfer device 10 to take out the object lot from an automatic tray storing lots and carries the lot to a processing system 20. The processing system 20 performs processing of the lot based on a control signal from the production control system 4.

Figure 10:
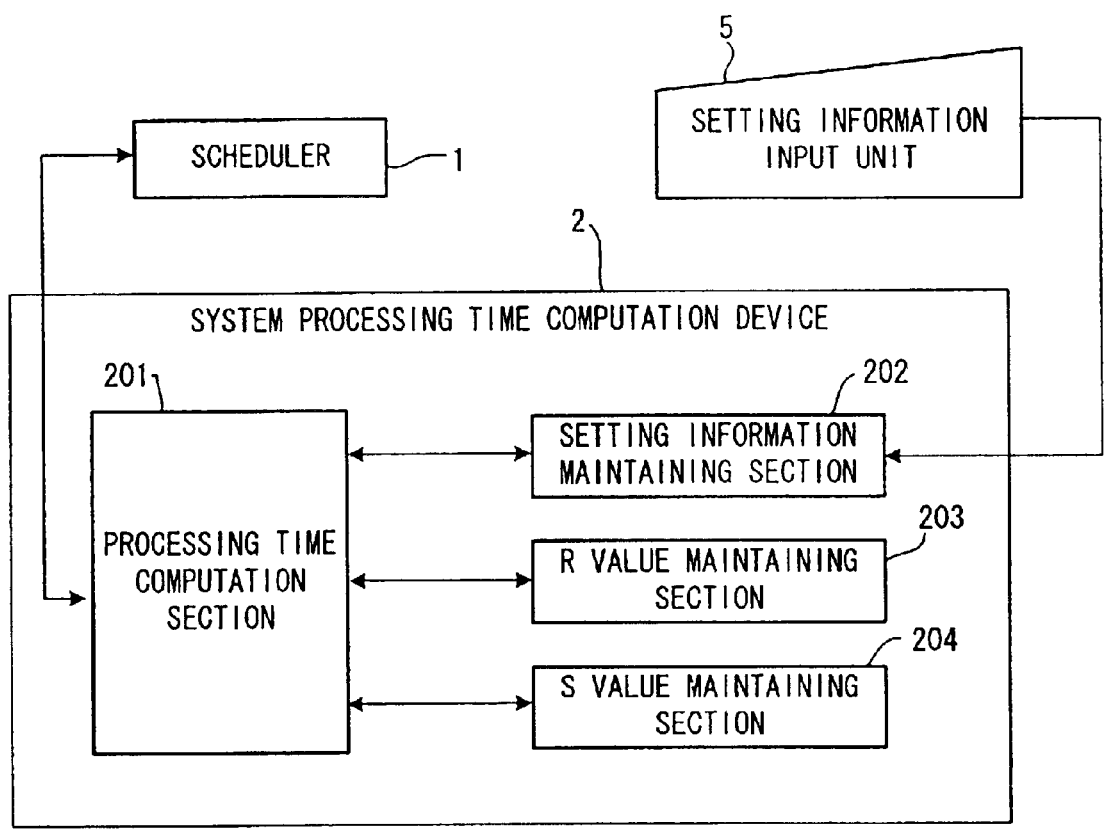
FIG. 10 is a block diagram of a system processing time computation device according to one preferred embodiment of the invention.

FIG. 10 is a block diagram showing the construction of a system processing time computation device in preferred embodiment 1 according to the invention. As shown in FIG. 10, the scheduler 1 gives information on the processing time computation object (processing conditions, the number of wafers to be processed, processing start time, and system used for the processing) to the system processing time computation device 2. The system processing time computation device 2 sends information, received from the scheduler 1, to a processing time computation section 201. Based on the information sent from the scheduler, the processing time computation section 201 retrieves, from a setting information maintaining section 202, the upper limit X of the number of times (upper limit of the number of simultaneously operable lots) for the processing system which performs processing.

The processing. time computation section 201 inquires of the scheduler 1 about the past operation history for past X times. The scheduler 1 gives the inquired past operation history for past X times (operation start time, operation end time (when the operation is not yet completed, a blank space is provided), processing conditions, the number of wafers to be processed, and the status of operation of the system) to the system processing time computation device 2. The system processing time computation device 2 sends the information, received from the scheduler 1, to the processing time computation section 201.

The processing time computation section 201 acquires, from an S value maintaining section 204, an S value indicating the minimum processing time for processing conditions for the processing time computation object. and processing conditions for each of past 0 to X−1 times.

The processing time computation section 201 acquires, from an R value maintaining section 203, an R value indicating the minimum end time difference for a combination of processing conditions for the processing time computation object with processing conditions for the operation immediately before the operation of the object and a combination of n times before the object with. n+1 times before the object in the past operation history wherein n is a number of 0 to X−1.

The processing time computation section 201 computes processing time using the information received from the scheduler 1, the information received from the setting information maintaining section 202, the information received from the S value maintaining section 204, and the information from the R value maintaining section 203. The system processing time computation device 2 gives the processing time computed in the processing time computation section 201 to the scheduler 1. The system processing time computation device 2 stores the setting information, sent from the setting information input device 5, in the setting information maintaining section 202.

Figure 11:
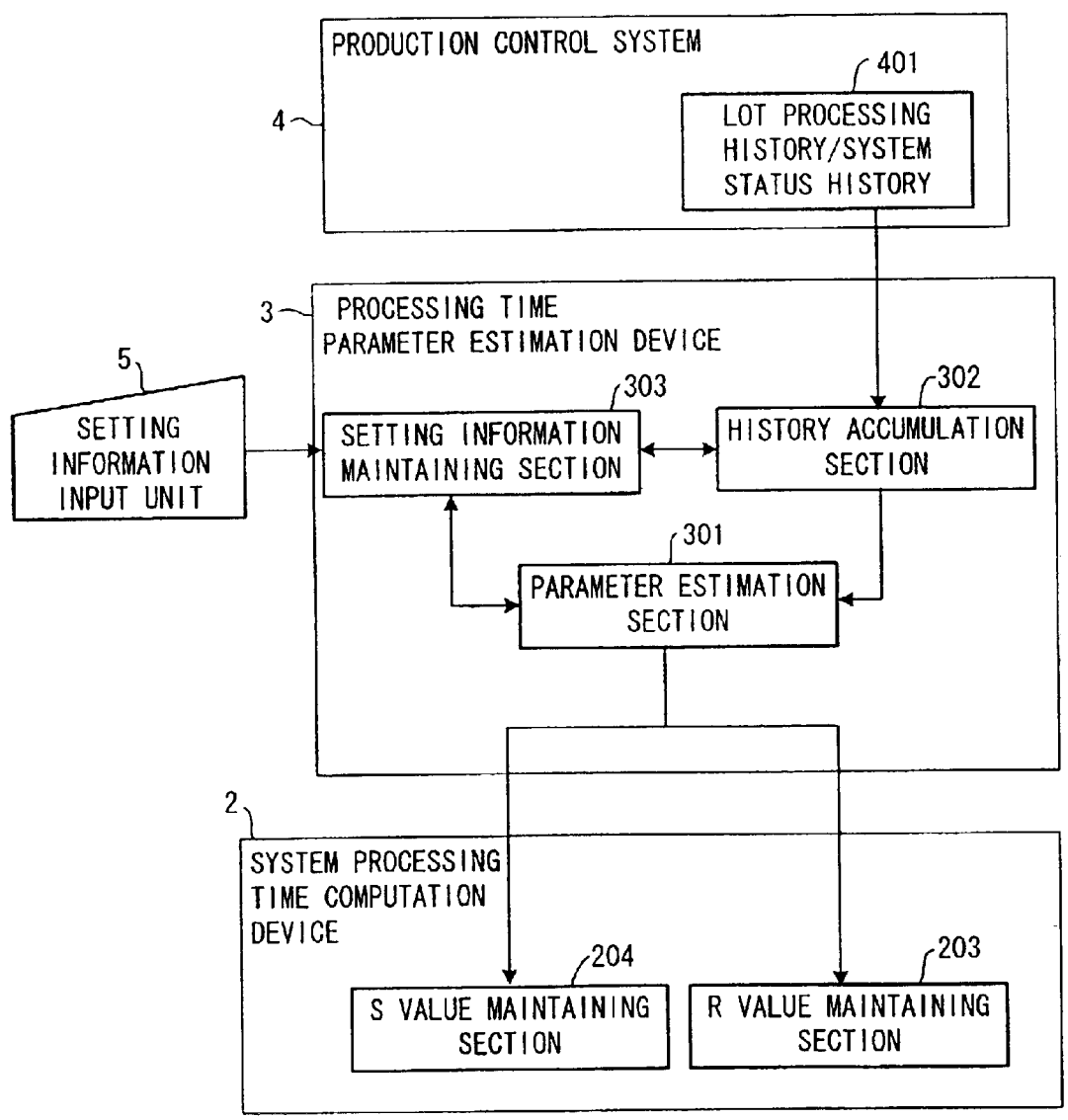
FIG. 11 is a block diagram of a processing time parameter estimation device according to one preferred embodiment of the invention.

FIG. 11 is a block diagram showing the construction of the processing time parameter estimation device 3 in the preferred embodiment 1 according to the invention. As shown in FIG. 11, the processing time parameter estimation device 3 comprises: i) a setting information maintaining section 303 which is a section for storing information on setting of processing systems (maximum number of processable lots in each processing system, the lower limit of the start time difference for estimation of S value (t1 in FIG. 6), the upper limit of the start time difference for estimation of R value (t2 in FIG. 7), group to which each of the operation conditions belongs, the maximum number of operable chambers, and the maximum number of operable load locks); ii) a parameter estimation section 301 for estimating parameters; and iii) a history accumulation section 302 for reaccumulating the history so as to facilitate the estimation of parameters. The production control system 4 maintains a history of each processing system in a past given period, that is, lot operation history (for each lot, operation start time, operation end time, processing system, the number of processed wafers, and operation conditions)/system status history (for each processing system, the time at which each chamber and each load lock have become operable and the time at which each chamber and each load lock have become inoperable, and, for each processing system, the number of operation chambers and the number of operation load locks for each operation report) 401.

In the system processing time computation device 2, the S value maintaining section 204 maintains an S value for each type of processing system, the number of wafers to be processed, group for each condition, the number of operation chambers, and the number of operation load locks, and the R value maintaining section 203 maintains R value for each of the number of wafers to be processed, the number of operation chambers, and the number of operation load locks with respect to each type of processing system, a group for each condition and a group for operation conditions adopted in the operation one before that operation.

The processing time parameter estimation device 3 acquires lot operation history/system status history 401 from the production control system 4. The processing time parameter estimation device 3 sends the acquired history to the history accumulation section 302. The history accumulation section 302 inquires of the setting information maintaining section 303 about setting information and acquires the setting information. The history accumulation section 302 accumulates history based on the acquired setting information and gives the accumulation results to the parameter estimation section 301. Upon the receipt of the accumulation results, the parameter estimation section 301 inquires of the setting information maintaining section 303 about setting information and acquires the setting information. Based on the accumulation results received from the history accumulation section 302 and the setting information acquired from the setting information maintaining section 303, the parameter estimation section 301 estimates an S value for each processing system and each processing condition and estimates an R value for each processing system and each combination of processing conditions. The processing time parameter estimation device 3 gives the S and R values estimated in the parameter estimation section 301 respectively to the S value maintaining section 204 and the R value maintaining section 203 in the system processing time computation device 2. The processing time parameter estimation device 3 stores the setting information received from the setting information input device 5 in the setting information maintaining section 303.

The construction of operation of the system processing time computation device 2 and the processing time parameter estimation device 3 have been described above. The scheduler 1, the production control system 4, and the transfer control system 6 shown in FIG. 9 are well known to a person having ordinary skill in the art and do not constitute the main point of the invention. Therefore, the detailed explanation of the construction thereof will be omitted.

Figure 12:
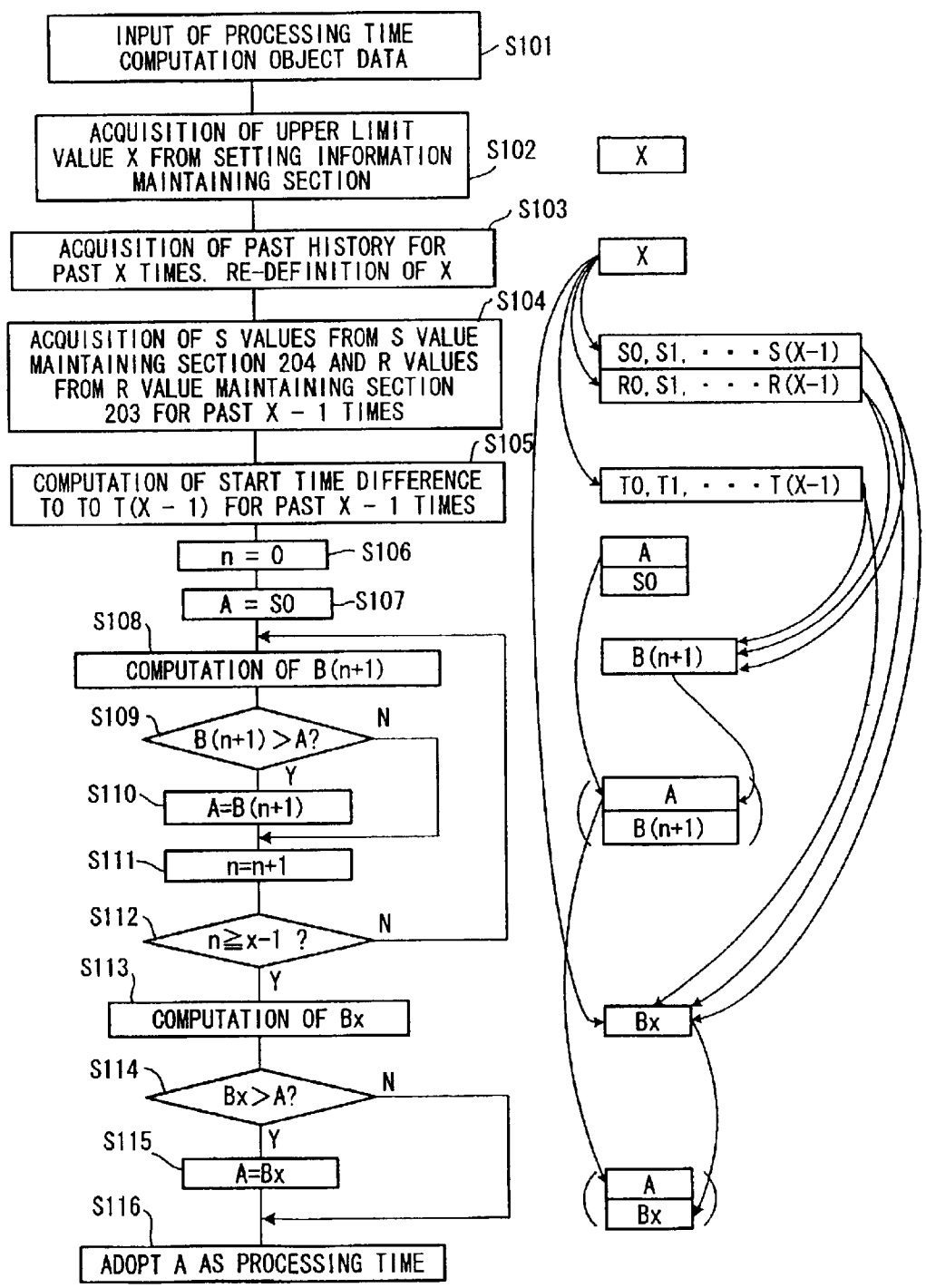
FIG. 12 is a flow chart showing the operation of a system processing time computation device according to one preferred embodiment of the invention.

The operation of the device shown in FIG. 10 will be explained in more detail in conjunction with FIG. 12 which is a flow chart for the processing time computation method according to the invention.

At the outset, processing time computation object data are given from a simulator 1 to the processing time computation section 201 (step S101). The processing time computation section 201 retrieves an operation object processing system from the processing time computation object data. The processing time computation section 201 acquires, from the setting information maintaining section 202, the upper limit X of the number of simultaneously operable lots in the processing system (step S102). The processing time computation section 201 makes a request to the scheduler 1 for the past history of operation reports for past X times (history of the status of operation of the system including the change of operation start time, operation end time, operation conditions, the number of processed wafers, and the number of operation chambers/the number of operation load locks, provided that, regarding a report not containing the operation end report, a blank space is provided in the place where the operation end time should be described, and, for a system having no chamber structure and a system not provided with load locks, a blank space is provided in the places where the number of operation chambers and the number of operation load locks should be described), receives the past history for past X times, and acquires the latest history report among the history reports containing an operation end report, and the processing number of this latest history report as counted from the present time is redefined as X. The processing time of the before-X-times operation is assumed to be PT (step S103).

Based on the past history of the operation reports for past X times, the processing time computation section 201 acquires, from the S value maintaining section 204, the S value determined by the group for each operation condition/the number of processed wafers in each case/the number of operation chambers/the number of operation load locks contained in the before-(X−1)-times operation, and acquires, from the R value maintaining section 203, the R value determined by the group for each operation condition contained in the before-X-times operation and group for conditions of the operation just before the before-X-times operation/the number of processed wafers in each case/the number of operation chambers/the number of operation load locks (step S104).

The processing time computation section 201 computes, based on the past operation history, for the object processing system, for example, T0 which is the difference between the scheduled time of the start of operation and the start time of the last operation for the lot 0, and T1 which is the difference between the start time of the last operation and the start time of the next to last operation. In this way, Tm is computed until m=X−1 wherein Tm represents the difference between the operation start time of the before-m-times operation and the operation start time of the before-(m+1)-times operation (step S105).

0 (zero) is input into n (step S106). The minimum processing time S0 acquired from the S value maintaining section 204 is input into the processing time candidate A (step S107).

Next, B(n+1) is determined by equation (iii) using a value S(n+1) acquired from the S value maintaining section 204 and determined by the group for operation conditions/the number of processed wafers/the number of operation chambers in the system/the number of operation load locks for the before-(n+1)-times operation, and the Rm value acquired from the R value maintaining section 203 and determined by a combination of the group for conditions for the before-m-times, wherein m=0 to n, operation with the group for conditions for the before-(m+1)-times operation and the number of processed wafers/the number of operation chambers in the system/the number of operation load locks for the before-m-times operation and the before-(m+1)-times operation, and Tm which has been acquired from the scheduler 1 and is the difference in start time between the before-(m+1)-times operation and the before-m-times operation (step S107).

$$B(n+1)=S(n+1)+\Sigma\{Rm-Tm\} \quad \text{(iii)}$$

wherein Σ represents the sum of m=0, . . . , and m=n.

The resultant B(n+1) is compared with the size of the processing time candidate A (step S109). If B(n+1)>A, then B(n+1) is input into A (step S110). n+1 is substituted for n (step S111). The size of n is compared with the size of X−1 (step S112). If n<(X−1), then the step is returned to step S107. If n≧(X−1), then Bx is determined by equation (iv) using actual processing time PT for the before-X-times operation, the Rm value determined by a combination of a group for operation conditions for the before-m-times operation, wherein m=0 to X−1, with a group for operation conditions for the before-(m+1)-times operation, and the number of processed wafers, the number of operation chambers, and the number of operation load locks for the before-m-times operation and the before-(m+1)-times operation, and Tm which is the difference in start time between the before-(m+1)-times operation and the before-m-times operation (step S113).

$$Bx=PT+\{Rm-Tm\} \quad \text{(iv)}$$

wherein Σ represents the sum of m=0, . . . , and m=X−1.

The size of Bx is compared with the size of A (step S114). If Bx>A, Bx is input into A (step S115). The processing time computation section 201 sends the A thus obtained as the processing time to the scheduler 1 (step S116).

Thus, in the invention, information on operation start time, processing conditions, and the status of processing system for past X-time operations is acquired, and the processing time is computed by using operation start time difference, the S value for each processing condition, and the R value determined by a combination of processing conditions for past X-time operations. Therefore, the system processing time (operation end time) can be estimated with higher accuracy than the case where a given value is used for the system and processing conditions.

Next, the operation of the processing time parameter estimation system 3 will be explained in conjunction with a flow chart shown in FIG. 13.

Figure 13:
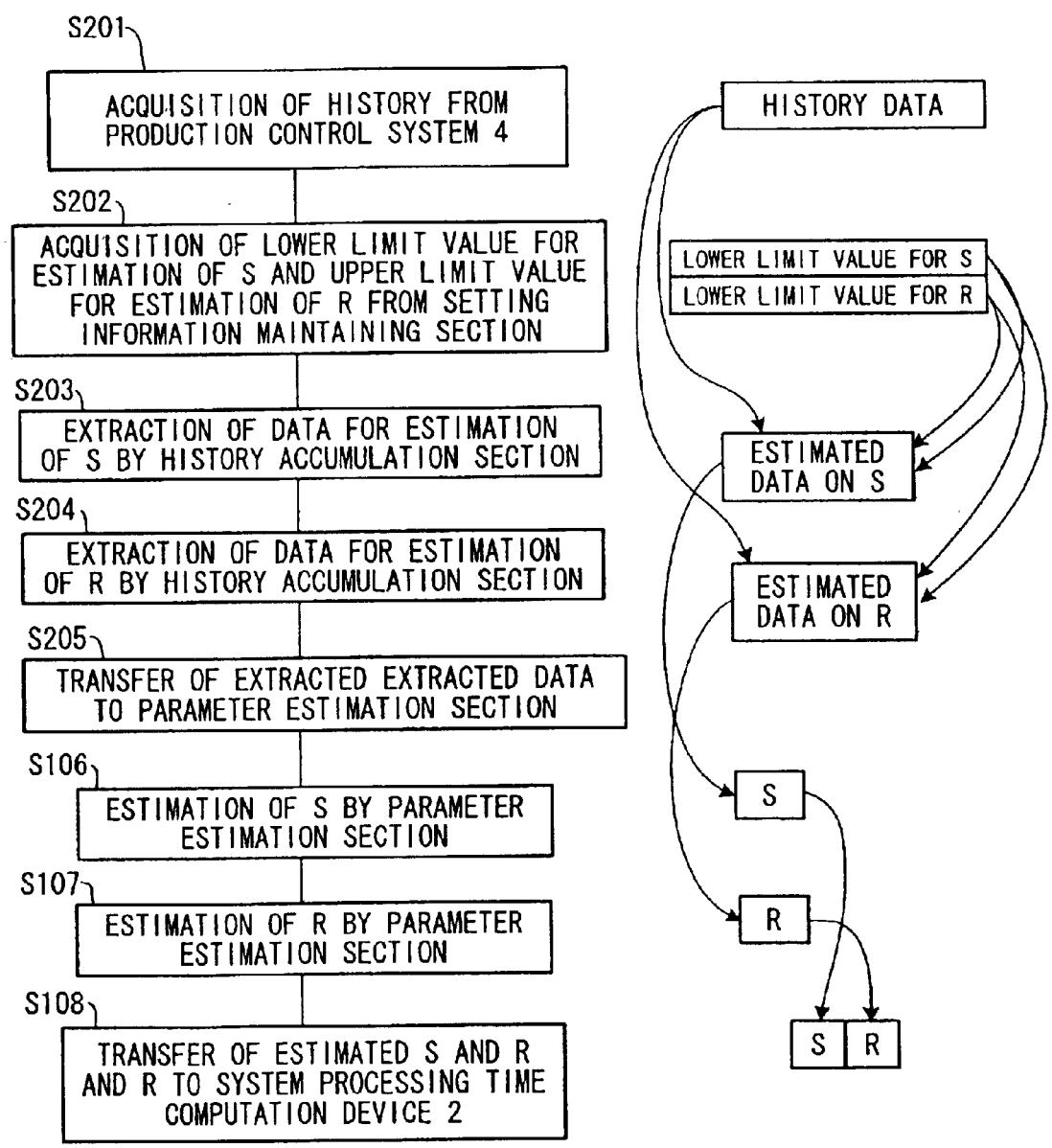
FIG. 13 is a flow chart showing a processing time parameter estimation device according to one preferred embodiment of the invention.

As shown in FIG. 13, the processing time parameter estimation device 3 inquires of the production control system 4 about and receives a lot operation history for each lot for a past given period, i.e., operation start time, operation end time, processing system used in the operation, the number of processed wafers, and processing conditions, and a system status history for each processing system, i.e., the time at operable which each chamber and each load lock have become and the time at which each chamber and each load lock have become inoperable, and, for each processing system, the number of operation chambers and the number of operation load locks for each operation report (step S201). The processing time parameter estimation device 3 receives, from the setting information maintaining section 303, the maximum number of processable lots in each processing system, the lower limit of the start time difference for estimation of the S value, the upper limit of the start time difference for estimation of the R value, the group to which each of the operation conditions belongs, the maximum number of operable chambers, and the maximum number of operable load locks (step S202). In this case, regarding a system having no chamber construction and a system having no load locks, blank space information is provided.

The history accumulation section 302 accumulates, from the history, the interval of operation start time between lots for each processing system, and, for each group to which each operation condition belong, accumulates, as original data for estimation of S, reports in which the start time difference for estimation of the S value is not less than the lower limit of the start time difference (step S203). Further, for each combination of a group to which each operation condition belongs with a group to which the condition for the operation one before that operation belongs, reports, in which the start time difference for estimation of the R value is not more than the upper limit of the start time difference, are accumulated as original data for estimation of R (step S204). The history accumulation section 302 gives the accumulation results to the parameter estimation section 301 (step S205). For each type of system, the group for each condition, the number of wafers processed, the number of operation chambers, and the number of operation load locks, the parameter estimation section 301 estimates, from the original data for estimation of S, the S value based on the absolute value of the difference between each start time and each end time (processing time) (step S206). For each type of system and a group for each operation condition and a group for condition for the operation just before that operation, the number of processed wafers, the number of operation chambers, and the number of operation load locks, the parameter estimation section 301 estimates, from the original data for estimation of R, the R value based on the end time difference (step S207).

The processing time parameter estimation device 3 gives the S and R values estimated in the parameter estimation section 301 to the S value maintaining section 204 and the R value maintaining section 203 in the system processing time computation device 2 (step S208).

Preferred Embodiment 2

Figure 14:
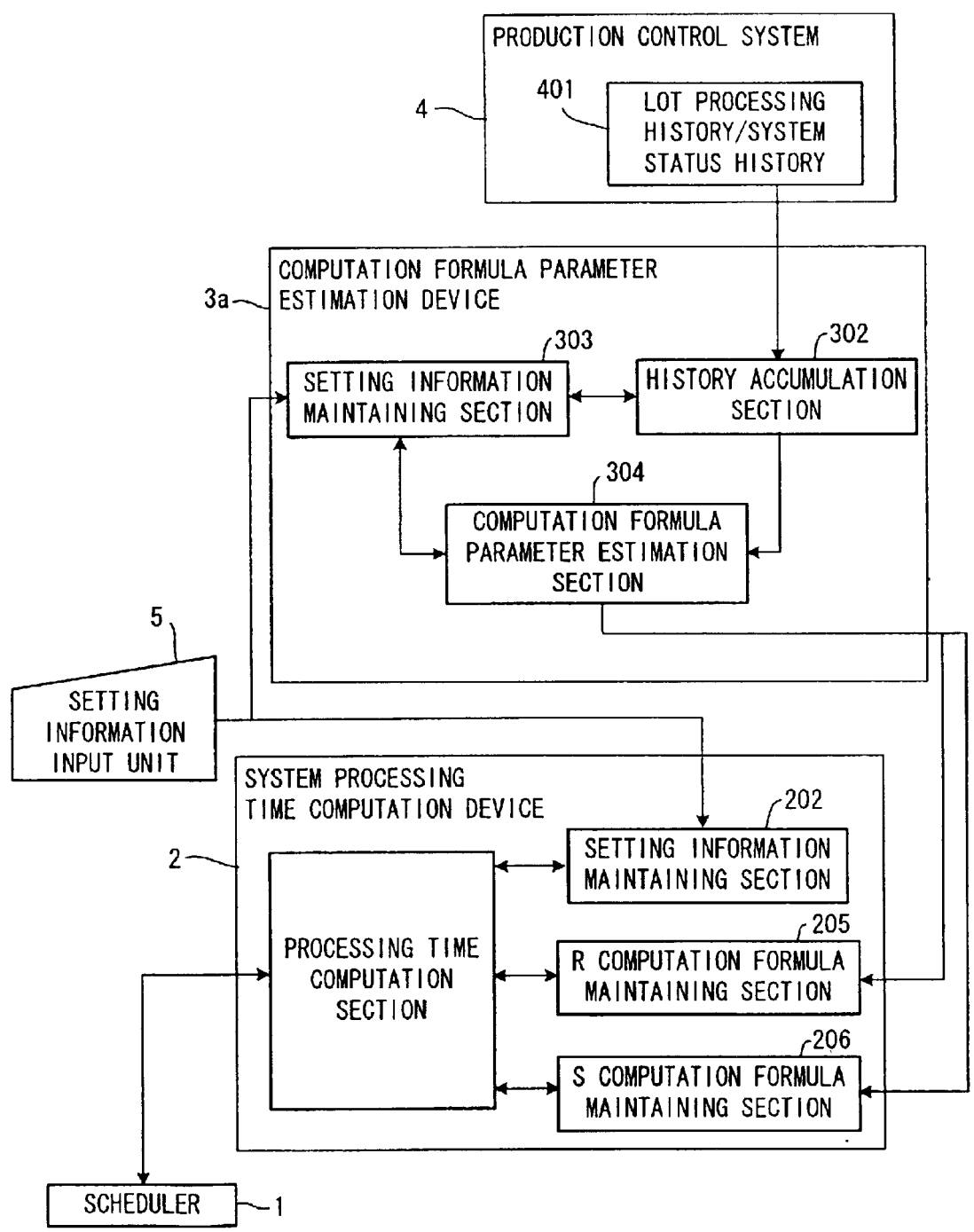
FIG. 14 is a block diagram showing another preferred embodiment of the invention.

FIG. 14 is a block diagram showing preferred embodiment 2 according to the invention. In this preferred embodiment, a computation formula parameter estimation section 304 in a computation formula parameter estimation device 3a estimates parameters for determining S and R by a computation formula. Specifically, the computation formula parameter estimation section 304 divides original data for estimation into the type of each system, a group for each condition, and operation load lock and estimates parameters D, E for the estimation of the S value as a primary expression S=D×M/C+E which is proportional to the inverse number of the number C of operation chambers, and the number M of wafers processed. Further, the computation formula parameter estimation section 304 divides original data for estimation of R into the type of each system and a group for each condition and a group for condition for the operation just before that operation/operation load locks in the operation just before that operation and estimates parameters F, G for the estimation of the R value as a primary expression R=F×M/C+G which is proportional to the inverse number of the number C of operation chambers in the operation just before that operation, and the number M of processed wafers in the operation just before that operation. The computation formula parameter estimation section 304 gives these parameters to the system processing time computation device 2. Upon the receipt of a request from the processing time computation section 201, an S value computation formula maintaining section 206 and an R value computation formula maintaining section 205 in the system processing time computation device 2 computes S and R values using the above parameters and the above primary expressions and gives the results to the processing time computation section 201. The other part of the construction is the same as the preferred embodiment 1.

Preferred Embodiment 3

Figure 15:
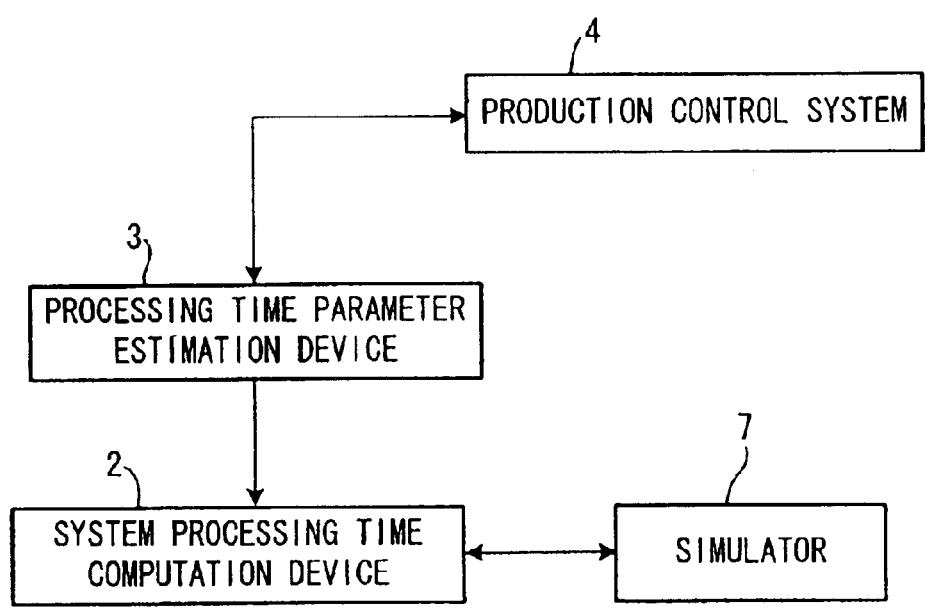
FIG. 15 is a block diagram showing a further preferred embodiment of the invention.

FIG. 15 is a block diagram showing preferred embodiment 3 of the invention. In this preferred embodiment, the system processing time is predicted based on simulation data output from a line simulator used in short-term prediction without any scheduler. In FIG. 15, a simulator 7 sends, to the system processing time computation device 2, operation history prediction data for simulation, prediction in-process data for simulation, information on lots for the allocation of operation to each processing system, and the operation start time.

The system processing time computation device 2 computes the system processing time (operation end time) using the operation history data and prediction in-process data and the parameters estimated in the processing time parameter estimation device 3 received from the simulator 7. The system processing time computation device 2 sends the system processing time to the simulator 7, and the simulator 7 executes line simulation based on the received system processing time.

As described above, in the invention, the start time interval and values determined by each combination of processing conditions in a past history and each combination of statuses of the processing system are determined from the past history of an identical system, and the results are used to compute the processing time. This can minimize the difference between the actual value and the predicted processing time. Therefore, according to the invention, unfavorable phenomena can be avoided such as control, which causes excessive operational standby of the processing system, and the occurrence of operational standby of a lot despite the lot having been scheduled so as to avoid the operational standby. Further, in the invention, the predicted processing time is not determined by the method wherein, for the processing within the processing system, each of the chamber processing times, the robot transfer time within the processing system, the load lock time and the like is specified in detail. Therefore, the necessity of inputting a very large number of data can be eliminated, and the predicted processing time can be obtained with the above-described high accuracy.

The invention has been described in detail with particular reference to preferred embodiments, but it will be understood that variations and modifications can be effected within the scope of the invention as set forth in the appended claims.

What is claimed is:

1. A method for the computation of a system processing time in performing an operation in a system which can process a plurality of lots in a continuous or parallel manner, comprising the step of:

computing a processing time of an object lot based on i) a minimum processing time S0 for the object lot, ii) contents of an operation of a lot currently being processed, and iii) an actual processing time PT of a latest completed lot with a completed operation, wherein the contents of the operation in the lot currently being processed include an operation start time and operation conditions of the lot currently being processed.

2. The method for the computation of a system processing time according to claim 1, wherein the processing time of the object lot is computed also based on i) a minimum processing time S1 to SX of lots before the object lot, ii) a minimum operation end time difference R between two successive lots, and iii) a operation start time difference T between two successive lots.

3. The method for the computation of a system processing time according to claim 2, said method comprising the further steps of:

(1) recognizing a processing number X of a latest completed lot, as counted from the present time, among all process lots the object lot being recognized as zero;

(2) determining i) the minimum processing times S0 to SX corresponding to the object lot and the lots before the object lot, ii) the minimum operation end time differences R0 to R(X−1) between each two successive lots, iii) the operation start time differences T0 to T(X−1) between each two successive lots, and iv) the actual processing time PT of the latest completed lot;

(3) performing a computation according to equation (i)

$$A1 = S(n+1) + \Sigma\{Rm - Tm\} \qquad (i)$$

wherein n=0; and Σ represents the sum of m=0 to X−2, and performing another computation according to equation (ii)

$$A2 = PT + \Sigma\{Rm - Tm\} \qquad (ii)$$

wherein Σ represents the sum of m=0 to X−1, wherein A=S0 to determine A, A1 and A2 values; and (4) regarding the maximum value among A, A2, and A3 as the processing time of the object lot for the computation of the processing time.

4. The method for the computation of a system processing time according to claim 3, wherein, in a case where there are two lots subsequent to the latest completed lot, X=2.

5. The method for the computation of a system processing time according to claim 2, said method comprising the sequential steps of:

(1) recognizing a processing number X of a latest completed lot, as counted from the present time, among all process lots the object lot being recognized as zero;

(2) determining i) the minimum processing times S0 to SX corresponding to the object lot and the lots before the object lot, ii) the minimum operation end time differences R0 to R(X−1) between each two successive lots, iii) the operation start time differences T0 to T(X−1) between each two successive lots, and iv) the actual processing time PT of the latest completed lot;

(3) initially adopting n=0 (zero), n being an integer;

(4) initially adopting A=S0;

(5) performing a computation according to equation (iii)

$$B(n+1)=S(n+1)+\Sigma\{Rm-Tm\} \quad \text{(iii)}$$

wherein $\Sigma$ represents the sum of m=0 to n, and adopting A=B(n+1) if B(n+1)>A, repeating the computation according to equation (iii) while increasing the n value by 1 until n=X−2;

(6) performing another computation accordingly to equation (iv)

$$Bx=PT+\Sigma\{Rm-Tm\} \quad \text{(iv)}$$

wherein $\Sigma$ represents the sum of m=0 to X−1, and adopting A=Bx if Bx>A, the obtained A value being regarded as the processing time of the object lot, wherein, in a case where there are two lots subsequent to the latest completed lot, X=2.

6. The method for the computation of a system processing time according to claim 3, wherein values estimated from past operation results are used as the minimum processing times S0 to SX and as the minimum operation end time differences R0 to R(X−1).

7. The method for the computation of a system processing time according to claim 3, wherein values obtained by computation, using parameters determined from past operation results, are used as the minimum processing times S0 to SX and as the minimum operation end time differences R0 to R(X−1) between two successive lots.

8. The method for the computation of a system processing time according to claim 3, wherein the operation start time differences T0 to T(X−1) and the actual processing time PT of the latest completed lot are computed based on reports from a system to be used in the processing.

9. A recording medium comprising, recorded thereon, a system processing time computation program for permitting the system processing time computation method according to claim 1 to be executed by a computer.

10. The method for the computation of a system processing time according to claim 4, wherein values estimated from past operation results are used as the minimum processing times S0 to SX and as the minimum operation end time differences R0 to R(X−1).

11. The method for the computation of a system processing time according to claim 4, wherein values obtained by computation, using parameters determined from past operation results, are used as the minimum processing times S0 to SX and as the minimum operation end time differences R0 to R(X−1) between two successive lots.

12. The method for the computation of a system processing time according to claim 4, wherein the operation start time differences T0 to T(X−1) and the actual processing time PT of the latest completed lot are computed based on reports from a system to be used in the processing.

13. A recording medium comprising, recorded thereon, a system processing time computation program for permitting the system processing time computation method according to claim 3 to be executed by a computer.

14. A recording medium comprising, recorded thereon, a system processing time computation program for permitting the system processing time computation method according to claim 4 to be executed by a computer.

* * * * *